(12) United States Patent
Ritter et al.

(10) Patent No.: US 7,553,785 B2
(45) Date of Patent: Jun. 30, 2009

(54) LEAD-FREE AND ARSENIC-FREE NIOBIUM PHOSPHATE OPTICAL GLASS

(75) Inventors: Simone Monika Ritter, Mainz (DE); Ute Woelfel, Mainz-Laubenheim (DE); Stefanie Hansen, Gensingen (DE)

(73) Assignee: Schott AG, Mainz (DE)

( * ) Notice: Subject to any disclaimer, the term of this patent is extended or adjusted under 35 U.S.C. 154(b) by 295 days.

(21) Appl. No.: 11/504,794

(22) Filed: Aug. 15, 2006

(65) Prior Publication Data

US 2007/0042891 A1 Feb. 22, 2007

(30) Foreign Application Priority Data

Aug. 17, 2005 (DE) .................. 10 2005 039 172

(51) Int. Cl.
*C03C 3/253* (2006.01)
*C03C 3/16* (2006.01)
*C03C 3/21* (2006.01)

(52) U.S. Cl. .................... 501/46; 501/42; 501/45

(58) Field of Classification Search ............ 501/45–46, 501/42
See application file for complete search history.

(56) References Cited

U.S. PATENT DOCUMENTS

| 6,333,282 B1* | 12/2001 | Nakahata et al. ............ 501/45 |
| 6,786,064 B2* | 9/2004 | Hayashi et al. ............ 65/32.1 |
| 2004/0018933 A1 | 1/2004 | Ogino et al. |
| 2004/0053768 A1 | 3/2004 | Bourova et al. |
| 2004/0266602 A1* | 12/2004 | Fujiwara et al. ............ 501/46 |
| 2005/0159290 A1 | 7/2005 | Yamamoto et al. |
| 2005/0164862 A1 | 7/2005 | Shiraishi |
| 2005/0192174 A1 | 9/2005 | Yamamoto et al. |

FOREIGN PATENT DOCUMENTS

| DE | 40 25 814 | 11/1991 |
| EP | 1 078 894 | 2/2001 |
| EP | 1 350 770 | 10/2003 |
| EP | 1 468 974 | 10/2004 |
| EP | 1 493 720 | 1/2005 |
| JP | 61040839 | 2/1986 |
| JP | 62128946 | 6/1987 |
| JP | 63170247 | 7/1988 |
| JP | 01219036 | 9/1989 |
| JP | 05270853 | 10/1993 |
| JP | 06345481 | 12/1994 |
| JP | 08104537 | 4/1996 |
| JP | 09188540 | 7/1997 |
| JP | 2001066425 | 3/2001 |
| JP | 2002173336 | 6/2002 |
| JP | 2002293572 | 10/2002 |
| JP | 2003160355 | 6/2003 |
| JP | 2003238197 | 8/2003 |

* cited by examiner

*Primary Examiner*—Jessica L Ward
*Assistant Examiner*—John A Hevey
(74) *Attorney, Agent, or Firm*—Michael J. Striker

(57) ABSTRACT

The lead-free, arsenic-free, preferably gadolinium-free and fluorine-free, optical glass has a refractive index of $1.86 \leq n_d \leq 1.95$, an Abbe number of $19 \leq v_d \leq 24$, a transformation temperature of $\leq 595°$ C., preferably $\leq 550°$ C., good crystallization stability, good processing properties and production properties. The optical glass is free of $Na_2O$, frree of $B_2O_3$ and has a composition (based on oxide content in % by weight) of $P_2O_5$, 14-31; $Nb_2O_5$, 22-50; $Bi_2O_3$, 5-36; $WO_3$, >10-25; $GeO_2$, 0-14; $Li_2O$, 0-6; $K_2O$, 0-6; $Cs_2O$, 1-7; MgO, 0-6; CaO, 0-6; SrO, 0-6; BaO, 0-6; ZnO, 0-6; $TiO_2$, 0-4; Σ alkali oxides, 2-12; Σ alkaline earth oxides, 0-10; Σ $Nb_2O_5$, $WO_3$, $Bi_2O_3 \leq 50$ and fining agents, 0-2.

9 Claims, 2 Drawing Sheets

LEAD-FREE AND ARSENIC-FREE NIOBIUM PHOSPHATE OPTICAL GLASS

BACKGROUND OF THE INVENTION

1. Field of the Invention

The present invention relates to a lead-free and arsenic-free and preferably fluorine-free niobium phosphate optical glass, to the use of such a glass in the fields of mapping, projection, telecommunication, optical communication engineering, mobile drive and laser technology, as well as to optical elements and so-called "preforms" of such optical elements, respectively.

2. Related Art

In recent years the trend in the market in the fields of optical and opto-electronic technologies (application fields; mapping, projection, telecommunication, optical communication engineering, mobile drive and laser technology) is toward more and more miniaturization. This is manifested in smaller and smaller finished products and of course demands increasing miniaturization of the individual structural members and components of such finished products. For the producers of optical glass this development translates into a definite decrease of required raw glass volumes in spite of increasing quantities of finished products. At the same time increased pricing pressure on the glass manufacturers arises from the re-processors, since the production of such smaller components made of block and/or ingot glass produces a noticeably greater percentage of waste. Also a higher operating expense is required for processing such miniaturized parts than for bigger components.

Instead of removing glass portions for optical components from a glass block or ingot, which is common up to now, recently production procedures have become important, in which preforms, which are as close as possible to the final contour or final geometry, such as e.g. gobs or spheres, may be obtained immediately after the glass melt. For example, the re-processors' requests for preforms, which are close to the final geometry for re-pressing, so-called "precision gobs", are increasing. Normally, the term "precision gobs" means preferably completely fire-polished, free or half-free formed glass portions, which are already portioned and have geometry, which is close to the final form of the optical component.

Such "precision gobs" may also preferably be converted into optical elements, which are lenses, aspherical elements, etc., by so-called "precise pressing" or by "precision molding" or "precision pressing". (German expression: "Blankpressen"). These terms are synonymous. Then further processing of the geometric shape of the surface, e.g. with a surface polish, is no longer required. Because of this process the smaller volumes of melted glass (distributed in a large number of small parts of the material) are accompanied in a flexible way by shorter setting times. However, because of the comparatively lower cycle number or number of parts and due to the small geometry as a rule, the added value of the process cannot be based on the value of the material alone. Rather, the products must leave the press in a state ready for installation, i.e. laborious post-processing, cooling and/or cold re-processing must not be necessary. Because of the required high accuracy of geometries, high-grade precision instruments and therefore expensive mold materials have to be used for such a pressing procedure. The lifetimes of such molds greatly affect the profitability of the products and/or materials produced. A very important factor for a long life-time of the molds is a working temperature, which is as low as possible, but which can only be lowered to a point at which the viscosity of the materials to be pressed is still sufficient for the pressing procedure. This means, that there is a direct causal relationship between the processing temperature, and thereby between the transformation temperature Tg of a glass to be processed, and the profitability of this pressing process: The lower the transformation temperature of the glass, the longer the lifetimes of the molds; and therefore the higher the earnings. Thus, there is a demand for so-called "low Tg glasses", i.e. glasses having low melting points and transformation temperatures, i.e. glasses with a viscosity which is sufficient for processing at temperatures, which are as low as possible.

Furthermore, from a procedural point of view of the melt, recently there is a growing demand for "short" glasses, i.e. glasses having a viscosity, which varies strongly within a certain viscosity range when there is a relatively small change in temperature. This viscosity behavior has the advantage that the times of hot forming in the melting process, i.e. the closure times of the molds, can be decreased. Because of that, on the one hand the throughput will be increased, i.e. the cycle times will be reduced. On the other hand, because of that also the mold material will be protected, which also has a positive effect on the total production costs, as described above. Such "short" glasses have the further advantage that also glasses with higher tendency to crystallize may be processed by faster cooling than with corresponding "longer" glasses. Therewith pre-nucleation, which could cause problems in succeeding steps of secondary hot forming, will be avoided. This makes it possible to draw such glasses to form glass fibers.

Furthermore it is also desirable that, besides the above-mentioned and the required optical properties, the glasses are sufficiently chemically resistant and have thermal expansion coefficients, which are as low as possible.

The prior art already describes glasses with a similar optical state or with a comparable chemical composition, but these glasses have huge disadvantages. In particular, many of the glasses contain higher proportions of $SiO_2$, which is a network forming agent and therefore increases the transformation temperature of the glass, causes a longer viscosity curve and reduces the refractive index and/or the amounts of components, such as $B_2O_3$, $Na_2O$ and F, which readily can evaporate during the melting and burning process. Thus an exact adjustment of the glass composition is difficult. This evaporation is also disadvantageous during the pressing process, in which the glass is heated again and may deposit on the surface of the mold and on the glass.

According to the prior art larger amounts of the component titanium oxide (more than 4% by weight) are often used, however the tendency to crystallize will be increased undesirably and further the UV cut-off is shifted to longer wavelengths.

EP 1 078 894 discloses an optical glass for precision forming with a refractive index of at least 1.83 and an Abbe number of at most 26. In every case the glass contains $Na_2O$ in an amount of at least 2.5% by weight, which is a disadvantage because of the aforesaid volatility of this component.

JP 01219036 describes an optical glass with high refractive index and high dispersion. The glass contains in every case $SiO_2$, which is a network-forming agent, in an amount of at least 5% by weight.

JP 2002173336 comprises a highly refractive optical glass with a refractive index of 1.75 up to 2.0 for precise pressing technology. The glass contains in every case 0.2 Mol % $B_2O_3$, which is volatile.

JP 09188540 describes a niobium phosphate optical glass having an improved stability to solarization. However it contains $WO_3$ in a maximum amount of only 10% by weight. In combination with the other required components an advantageous refractive index of >1.86 cannot be achieved in this glass.

JP 06345481 describes the production of a $P_2O_5$—$TiO_2$ glass with improved transmission. It contains $TiO_2$ in a proportion of at least 5% by weight. Such a high content of $TiO_2$ shifts the UV cut-off to longer wavelengths, which is not desired, and promotes devitrification of the glass.

JP 05-270853 describes a niobium phosphate glass with improved transmission and stability to devitrification, a refractive index of 1.53 to 1.85 and an Abbe number of 18 to 48. Nevertheless, it contains $WO_3$ in a maximum amount of only 10% by weight. In combination with the other required components an advantageous refractive index of >1.86 cannot be thereby achieved.

JP 2002293572 describes optical glass for eyeglass lenses, which contains in every case the components $B_2O_3$ and $Na_2O$. In addition, the $P_2O_5$ content is more than 32% by weight, which is so high that in combination with the other required components an advantageous refractive index of >1.86 cannot be thereby achieved.

JP 2003160355 describes an optical glass with a refractive index of higher than 1.83 for precision pressing. However the glass contains in every case the easily evaporated component $Na_2O$.

JP 2001066425 comprises a substrate glass for optical filters with a thermal expansion coefficient of 9 to $12*10^{-6}$/K in the temperature range of −20 to +70° C. Glasses of the present invention generally have thermal expansion coefficients that are less than the thermal expansion coefficients of the glass of this JP reference, which is advantageous and which imparts the glasses with positive properties, so that they are insensitive to differences in temperature. Besides, according to this prior art reference a sum of the content of silicon, barium and phosphorous oxide of 35 to 55% by weight is desirable. With such a high content of these components in connection with the other required components an advantageous refractive index of >1.86 cannot be achieved.

EP 1 350 770 describes an optical glass with a refractive index of 1.88 and an Abbe number of 22 to 28. Nevertheless, it contains in every case at least 15% by weight of $SiO_2$ and at least 5% by weight of $TiO_2$.

JP 081004537 describes a highly refractive and high dispersion optical glass. Nevertheless, it contains in every case at least 1% by weight of $B_2O_3$.

JP 62128946 concerns a highly refractive telluric glass, which comprises toxic tellurium oxide as a component, in every case.

The documents JP 63170247, DE 4025814 and US Published Patent Application 2004/053768 describe optical glasses, which indeed can be free of lead and free of fluorine, however they contain $SiO_2$ in every case.

The documents JP 2003238197, US Published Patent Application 2004/018933 and EP1468974 disclose optical glasses, which contain sodium oxide as a component, in every case.

JP 61040839 describes an optical phosphate glass, which contains at least 1% by weight $Sb_2O_3$ in every case.

EP 1 493 720 describes an optical glass for precise pressing. But this glass has an undesirably large thermal expansion coefficient of $11-18.4*10^{-6}$/K in the temperature range of 100 to 300° C. The glass comprises $Li_2O$ in an amount of more than 3% by weight.

US Published Patent Application 2005/0164862 discloses glass, which can contain either bismuth or tungsten oxide as a component, and also contains antimony oxide in the glass, in every case.

US Published Patent Application 2005/0159290 discloses glasses suited for precision molding comprising niobium oxide in an amount of less than 22% by weight. According to this application if amounts of niobium oxide are above 22% by weight an undesirable coloration of the glass occurs when it is exposed to UV light.

US 2005/0192174, which was published after the priority date of the present invention, describes glasses suited for precision molding comprising more than 14% by weight of germanium oxide. It is stated that the desirable refractive index cannot be achieved when less than 14% by weight of this compound are present in the glass.

SUMMARY OF THE INVENTION

It is an object of the present invention to provide an optical glass, which has desired and advantageous optical properties ($n_d/v_d$) and low transformation temperatures, and particularly which, because of ecological considerations, is free of PbO, $Tl_2O$, $TeO_2$, and $As_2O_3$ and preferably free of $SiO_2$ and/or $B_2O_3$ and/or $Na_2O$ and/or fluorine. Most preferred glasses are free of the volatile compound $B_2O_3$.

Furthermore it should be possible to process these glasses by the precision pressing method and they should be suitable for the following application fields: mapping, projection, telecommunication, optical communication, engineering, mobile drive and laser technology.

It is also an object of the present invention to provide an optical glass having a refractive index $n_d$ of $1.86 \leq n_d \leq 1.95$, an Abbe number $v_d$ of $19 \leq v_d \leq 24$ and preferably a transformation temperature Tg, which is as low as possible, especially preferably a $Tg \leq 570°$ C.

It is another object of the present invention to provide an optical glass, which has good meltability and processability and sufficient crystallization stability, which enables production in continuously conducted aggregates.

It is a further object of the present invention to provide a glass, which is as "short" as possible within a viscosity range of $10^{7.6}$ to $10^{13}$ dPas. A so-called short glass is generally known to be a glass, which within the viscosity range of $10^2$ to $10^{13}$ dPas, has a very steep viscosity curve. The glass according to the present invention should be "short" within a viscosity range of $10^{7.6}$ to $10^{13}$ dPas.

The foregoing objects are attained by the embodiments of the present invention, which are claimed by the appended patent claims.

In particular, a lead-free and arsenic-free and preferably $SiO_2$-free, $B_2O_3$-free, $Na_2O$-free, and fluorine-free optical glass with a refractive index $n_d$ of $1.86 \leq n_d \leq 1.95$, an Abbe number $v_d$ of $19 \leq v_d \leq 24$ is provided, which has a glass composition comprising the following components (based on oxide content in % by weight):

| | |
|---|---|
| $P_2O_5$ | 14-31 |
| $Nb_2O_5$ | 22-50 |
| $Bi_2O_3$ | 5-36 |
| $WO_3$ | >10-30 |
| $GeO_2$ | 0-14 |
| $Li_2O$ | 0-6 |
| $K_2O$ | 0-6 |
| $Cs_2O$ | 0-7 |
| MgO | 0-6 |
| CaO | 0-6 |
| SrO | 0-6 |
| BaO | 0-6 |
| ZnO | 0-6 |
| $TiO_2$ | 0-4 |

-continued

| | |
|---|---|
| Σ Alkali oxides | 2-13 |
| Σ Alkaline-earth oxides | 0-10 |
| Σ Nb$_2$O$_5$, WO$_3$, Bi$_2$O$_3$ | ≧50 |
| Conventional fining agents | 0-2. |

Preferably, the sum of the alkali oxides is in the range of 2 to 12, and more preferably in the range of 2 to 11,% by weight. According to a preferred embodiment of the invention, Li$_2$O is present in the glass composition in an amount of at most or less than 3% by weight.

The sum of the oxides Nb$_2$O$_5$, WO$_3$, Bi$_2$O$_3$ is greater than or equal to 50% by weight.

Preferably the glasses are free from not-mentioned components.

The glass according to the present invention has the same optical state, such as the Abbe number and the refractive index, as known optical glass of similar glass families. However, the glass of the invention is characterized by good meltability and processability, as well as by good environmental compatibility.

In particular, these glasses are suitable for processing close to the final contour or shape, such as e.g. for production of precision gobs, as well as for a precision pressing process for production of an optical component having an exact final contour or shape. In this connection, the viscosity temperature profile and the processing temperature of the glasses according to the present invention have been preferably adjusted in such a way that hot forming close to the final geometry and/or final contour is also possible with sensitive precision machines.

In addition, the combination of the crystallization stability and the viscosity temperature profile of the glasses according to the present invention may facilitate a thermal (further) treatment (pressing and/or re-pressing) of the glasses, almost without any problems.

In particular, the glasses according to the present invention have a refractive index n$_d$ of 1.86>n$_d$≦1.95, preferably of 1.86≦n$_d$≦1.94, particularly preferably of 1.87≦n$_d$≦1.94, and an Abbe number of 19≦v$_d$≦24, preferably of 19.5≦v$_d$≦23.5, and particularly preferably of 20≦v$_d$≦23.

According to one embodiment of the present invention, the glasses according to the present invention have a transformation temperature Tg≦595° C., more preferably Tg≦570° C. and most preferably Tg≦550° C.

According to the present invention, a so-called "low Tg glass" is a glass having a low transformation temperature Tg, i.e. preferably a Tg of at most 595° C.

Preferably the glasses according to the present invention are as "short" as possible, in a viscosity range of 10$^{7.6}$ to 10$^{13}$ dPas. In this case, by the term "short glasses" glasses are meant, which have a viscosity that varies strongly at a relatively small change of temperature within a certain viscosity range. Preferably, the temperature interval ΔT, in which the viscosity of this glass decreases from 10$^{7.6}$ to 10$^{13}$ dPas, is at most 120 K.

BRIEF DESCRIPTION OF THE DRAWING

The objects, features and advantages of the invention will now be illustrated in more detail with the aid of the following description of the preferred embodiments, with reference to the accompanying figures in which:

In FIG. 1, the vertical lines show the temperature interval ΔT, in which the viscosity of this glass increases from 10$^{13}$ to 10$^{7.6}$ dPas. In this case, ΔT is between 610 and 514° C., i.e. it is 96 K.

DESCRIPTION OF THE PREFERRED EMBODIMENTS

Figure 1:
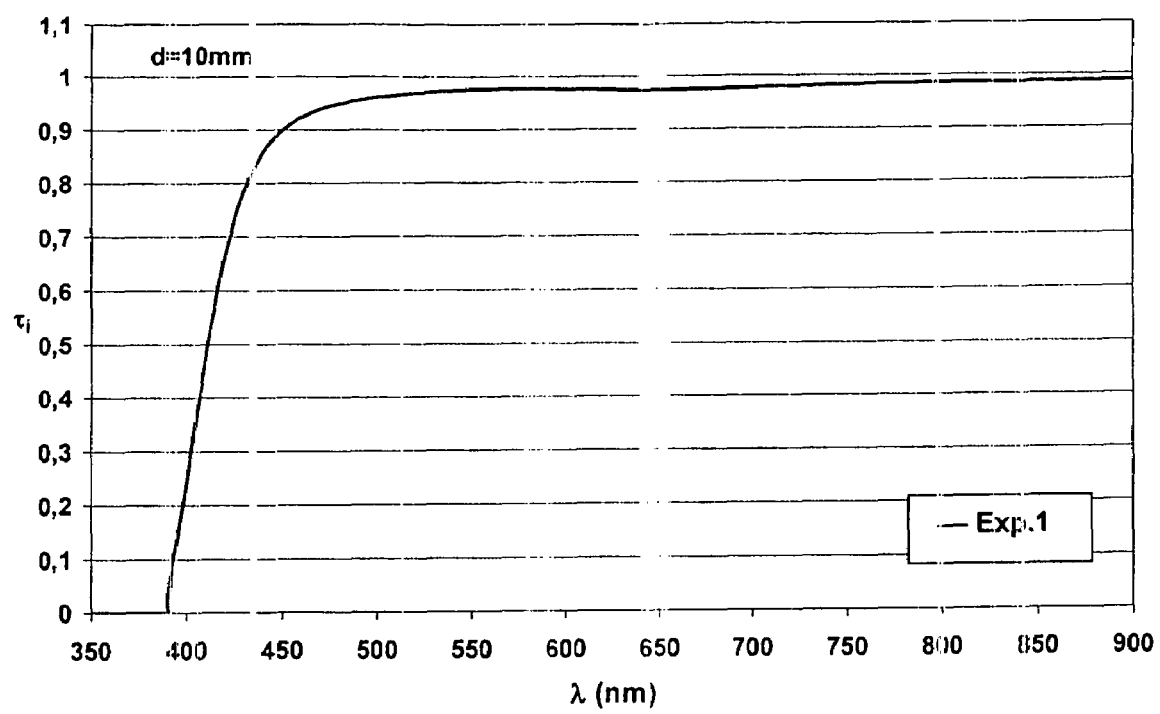
FIG. 1 is a graphical illustration of the dependence of the internal transmission of a glass according to example 1 of the present invention on wavelength of the transmitted radiation.
Figure 2:
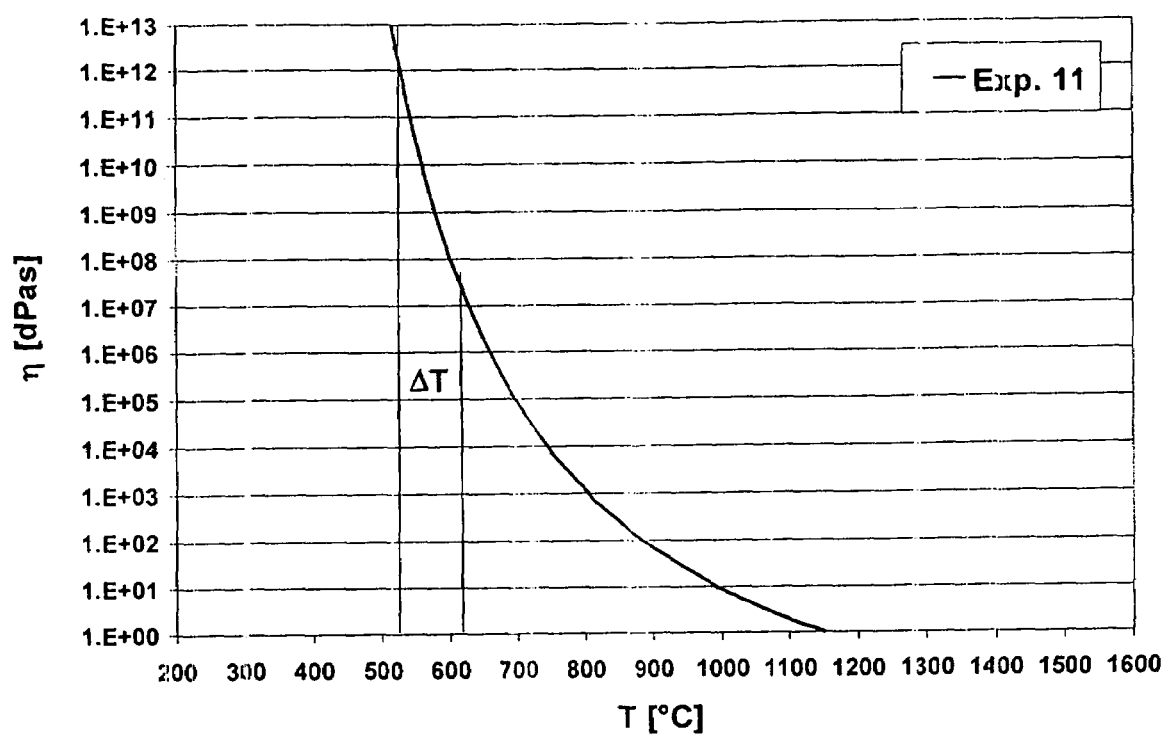
FIG. 2 is a graphical illustration of the dependence of viscosity on temperature for example 11 of the glass according to the present invention.

The term "inner quality" of a glass according to the present invention means that the glass contains a proportion of bubbles and/or striae and/or similar defects which is as low as possible, respectively preferably, that it does not contain such defects at all.

In the following, the term "X-free" or "free of a component X" respectively means that the glass substantially does not contain this component X, i.e. that such a component is only present in the glass as an impurity, however that it is not added to the glass composition as a single component. Here, X represents an arbitrary component, such as for example Na$_2$O.

In the following, all proportion data of the glass components are given in % by weight and are based on oxide, unless otherwise stated.

The basic glass system of the glass according to the present invention is a niobium phosphate system, which is a good basis for the desired properties.

The glass according to the present invention has a proportion of P$_2$O$_5$ of at least 14% by weight, preferably of at least 16% by weight, particularly preferably of at least 18% by weight. The proportion of P$_2$O$_5$ is limited to at most 31% by weight, preferably at most 28% by weight, particularly preferably at most 25% by weight. The mentioned minimum proportion should not fall below 14% by weight, otherwise the viscosity/Tg of the glass would be increased too much. The maximum proportion of 31% by weight should not be exceeded, in order to guarantee the high refractive index.

The glass according to the present invention has a proportion of Nb$_2$O$_5$ of at least 22% by weight, preferably of at least 27% by weight, particularly preferably 30% by weight. The maximum proportion of Nb$_2$O$_5$ is 50% by weight, preferably at most 45% by weight, further perferably at most 40% by weight. The mentioned maximum proportion of 50% by weight should not be exceeded, in order to avoid too much decrease of the Abbe number. The minimum proportion should not fall below 22% by weight, in order to guarantee the high refractive index.

The glass according to the present-invention contains at least 5% by weight Bi$_2$O$_3$, but preferably at least 5.5% by weight and particularly preferably at least 6% by weight. The proportion of Bi$_2$O$_3$ is at most 36% by weight, preferably at most 25% by weight, particularly preferably at most 18% by weight. Bi$_2$O$_3$ contributes to the desired viscosity temperature behavior ("short" glass) in the viscosity range of 10$^{7.6}$ to 10$^{13}$ dPas. Furthermore, it reduces the Tg and increases the density of the glass. The latter guarantees a high refractive index. The maximum proportion of 36% by weight should not be exceeded, since the self-coloring of Bi$_2$O$_3$ of the glass would have a too negative effect on the transmission of the glass. However, the proportion should not fall below the minimum proportion of 5% by weight in order to guarantee the low Tg in combination with a high refractive index of the glass according to the present invention.

The glass according to the present invention contains at least >10% by weight WO$_3$, but preferably at least 11% by weight and particularly preferably at least 12% by weight.

The maximum proportion of $WO_3$ is limited to at most 25% by weight, preferably at most 21% by weight, and further preferably at most 17% by weight. The mentioned maximum proportion of 25% by weight should not be exceeded. Otherwise the viscosity of the glass would increase too much. The minimum proportion should not fall below <10% by weight, in order to guarantee the high refractive index.

The glass according to the present invention may contain a proportion of $GeO_2$ of at most 14% by weight, preferably at most 10% by weight, particularly preferably at most 7% by weight. The given maximum proportion of 14% by weight should not be exceeded. Otherwise the glass would be too expensive and thus not economical.

Due to the production process the glass may contain up to 2% by weight $SiO_2$. More suitable are glasses containing at most 1% by weight of $SiO_2$. Preferably the glass of the invention is free of $SiO_2$. $SiO_2$ results in increased glass transition temperatures and viscosities of the glass.

Furthermore the glass is preferably free of $B_2O_3$. Glass containing $B_2O_3$ will cause the glasses to become "longer", which is also not preferable according to the present invention. Further, during the melting and burning process there is a tendency for the components to evaporate. Thus an exact adjustment of the composition is difficult. Besides when the glass is heated again e.g. during the pressing process, this evaporation may also negatively affect the surface of the glass and/or the surface of the molds.

The glass according to the present invention contains $Li_2O$ as an alkali metal oxide in an amount of at most 6% by weight, preferably of at most 4% by weight, more preferably of at most ≦3% by weight. The glass according to the present invention may contain $Li_2O$ in an amount of at least 0.5% by weight, preferably of at least 0.7% by weight.

According to a particularly preferable embodiment of the present invention, the glass is free of $Na_2O$.

The glass according to the present invention contains at most 6% by weight $K_2O$, but preferably of at most 5% by weight and particularly preferably at most 4% by weight. The glass according to the present invention may contain a proportion of $K_2O$ of at least 0.5% by weight.

If the glass contains cesium oxide, it is contained in amounts of at most 7% by weight and preferably of at most 6% by weight. The glass according to the present invention may contain at least 0.5% by weight $Cs_2O$, but preferably at least 1% by weight and particularly preferably at least 2% by weight.

The sum of alkali metal oxides in the glass according to the present invention is 2 to 12% by weight. Preferable the sum is at most 10% by weight and particularly preferable at most 9% by weight. The sum of alkali metal oxides is at most 12% by weight, wherein this value should not be exceeded, because otherwise the refractive index of such a glass system will be decreased too much. The addition of the alkali metal oxides is for the optimization of the melting behavior, i.e. they have an effect as fluxing agents. Furthermore, they contribute to the lowering of the Tg.

For flexible regulation of the viscosity-temperature behavior, the glass according to the present invention may optionally contain alkaline earth metal oxides (MO), which are selected from the group consisting of MgO, CaO, SrO and BaO. The amount of the individual components should not exceed 6% by weight. The glass according to the present invention may contain one or more components of MgO, CaO, SrO or BaO in an amount of at least 0.5% by weight, preferably of at least 1% by weight. The sum of alkaline earth metal oxides MO is at most 10% by weight, preferably at most 7% by weight and most preferably at most 6% by weight. The alkaline earths contribute to a steep viscosity curve. The maximum proportion of 10% by weight should not be exceeded, since higher proportions in the glass result in devitrification, in particular during re-heating.

The glass according to the present invention may contain ZnO in a range between 0 to at most 6% by weight, more preferably between 0 to at most 4% by weight, further preferably between 0 to at most 2% by weight. Especially preferably the glass is free of ZnO because it tends to evaporate.

The glass is preferably free of $TiO_2$. It may contain $TiO_2$ in an amount of 0 to at most 4% by weight, preferably at most 3% by weight and particularly preferably at most 1.5% by weight. $TiO_2$ contributes to a high refractive index and a high dispersion and may serve for the adjustment of the optical state. But this component results in increased transition temperatures and viscosities of the glass. Also it negatively affects the transmission by absorption in UV. An amount of 4% titanium oxide should not be exceeded, because this component acts as a nucleating agent, which may consequently cause devitrification and thus is not desired.

Preferably, the sum of the oxides $Nb_2O_5$, $WO_3$ and $Bi_2O_3$ is higher than 50% by weight, more preferably higher than 55% by weight and particularly preferably higher than 57% by weight. The high refractive index of the glass according to the present invention is guaranteed because of this sum limitation.

Preferably, the glass according to the present invention as an optical glass is also free of coloring and/or optically active, such as laser active, components.

In particular, the glass according to the present invention is also preferably free of components, which are sensitive to redox reactions, such as for example Ag, and/or free of components, which are toxic and detrimental to health, such as the oxides of Tl, Te, Be and As. In every case, the glass is free of PbO and arsenic.

According to one embodiment of the present invention, the glass according to the present invention is also preferably free of other components, which are not mentioned in the claims. According to this embodiment, the glass substantially consists of the components mentioned. In this case, the term "substantially consisting of" means that other components are only present as impurities and that they are not intentionally added to the glass composition as individual ingredients.

The glass according to the present invention may contain conventional fining agents in small amounts. Preferably, the amount of added fining agents is at most 2.0% by weight, more preferably at most 1.0% by weight. As fining agent, at least one of the following components may be contained in the glass according to the present invention (in % by weight, in addition to the residual glass composition):

| | |
|---|---|
| $Sb_2O_3$ | 0-1 and/or |
| SnO | 0-1 and/or |
| $SO_4^{2-}$ | 0-1 and/or |
| $F^-$ | 0-1. |

Also fluorine and fluorine containing compounds tend to evaporate during the melting and burning process and thus make an exact adjustment of the glass composition difficult. Therefore, preferably the glass according to the present invention is also free of fluorine.

Preferably, according to the present invention the phosphate is added to the glass batch in the form of a "complex phosphate". Also that is the reason why a maximum of 31% by weight is advantageous, because when higher amounts are added the proportion of "complex phosphate" decreases in favor of the "free" $P_2O_5$, which may cause a condition that leads to uncontrolled melting and to clearly increased evaporation effects as well as to dusting, accompanied by a worsening of internal quality. In addition, an increased amount of free, i.e. not complex, phosphate, causes increased safety requirements for the production operation, thus increasing production costs. According to the present invention the expression "complex phosphate" means that no phosphate in the form of $P_2O_5$ is added to the mixture, but components like MO and $M_2O$ are not added, for instance, in form of an oxide or a carbonate, but rather are added to the mixture as phosphates, for example as barium hydrogen phosphate and/or metaphosphate and alkali hydrogen phosphate and/or metaphosphate. Thereby the glass production process is considerably improved. The tendency to form dust can be reduced drastically because complex phosphates can be moistened in contrast to free phosphate. Furthermore evaporation of components from the glass melt tends to decrease. Thus the homogeneity of the glass melt, which is reflected especially in the quality and the homogeneity of the optical data of the glass produced from it, is improved.

Further, the present invention relates to the use of the glass according to the present invention for the application fields; mapping, projection, telecommunication, optical communication engineering, mobile drive and laser technology.

Further, the present invention relates to optical elements, which comprise the glass according to the present invention. Here, optical elements may be in particular lenses, aspherical elements, prisms and compact structural members. In this case, according to the present invention the term "optical element" comprises also preforms of this sort of optical element, such as glass gobs, precision glass gobs and the like.

In the following, the present invention is explained in detail by a series of examples. But the present invention is not limited to the mentioned examples.

EXAMPLES

The following examples comprise preferred glasses according to the invention, the details of which should not limit the protection provided by the claims.

Example 1

The raw materials for the oxides are weighed out, one or more fining agents, such as $Sb_2O_3$, are added and subsequently these ingredients are mixed well. The glass mixture is melted into a continuous melting aggregate at ca. 1100° C. and oxygen is bubbled into the aggregate. Then it is fined (1100° C.) and homogenized. At a casting temperature of approximately 1160° C., the glass can be cast and processed to the desired dimensions. Experience has shown that in a continuous aggregate of high volume, the temperatures can be reduced at least ca. 100 K and the material can be processed by the pressing method close to the final geometry.

TABLE I

MELTING EXAMPLE FOR 100 KG OF CALCULATED GLASS
(ACCORDING TO EXEMPLARY GLASS 11)

| Oxide | % by weight | Raw material | Weight (g) |
|---|---|---|---|
| $P_2O_5$ | 20.83 | $P_2O_5$ | 8,836.2 |
|  |  | $Ba(H_2PO_4)_2$ | see below |
|  |  | $Ca(H_2PO_4)_2$ | see below |
|  |  | $Li_3PO_4$ | see below |
| $Nb_2O_5$ | 32.85 | $Nb_2O_5$ | 32,925.5 |
| $Bi_2O_3$ | 14.00 | $Bi_2O_3$ | 14,033.5 |
| $WO_3$ | 14.03 | $WO_3$ | 14,042.0 |
| $GeO_2$ | 5.00 | $GeO_2$ | 5,002.2 |
| $Li_2O$ | 3.05 | $Li_3PO_4$ | 7,881.1 |
| $K_2O$ | 1.02 | $KNO_3$ | 2,184.6 |
| $Cs_2O$ | 5.13 | $Cs_2CO_3$ | 5,931.4 |
| BaO | 2.00 | $Ba(H_2PO_4)_2$ | 4,466.0 |
| CaO | 2.00 | $Ca(H_2PO_4)_2$ | 14,033.5 |
| $Sb_2O_3$ | 0.1 | $Sb_2O_3$ | 100.4 |
| Sum | 100.01 |  | 105,162.6 |

Example 2

Table II comprises examples of glasses according to the present invention, namely exemplary glasses 1 to 14

TABLE II

EXEMPLARY GLASS COMPOSITIONS 1 TO 7 (BASED ON OXIDE CONTENT IN % BY WEIGHT) AND THEIR PROPERTIES

|  | Example No. | | | | | | |
|---|---|---|---|---|---|---|---|
|  | 1<br>% by weight | 2<br>% by weight | 3<br>% by weight | 4<br>% by weight | 5<br>% by weight | 6<br>% by weight | 7<br>% by weight |
| $P_2O_5$ | 20.33 | 20.83 | 22.83 | 20.83 | 21.62 | 20.18 | 20.91 |
| $GeO_2$ | 6.10 | 5.00 | 5.00 | 5.00 | 3.00 | 4.26 | 6.03 |
| $Li_2O$ | 3.05 | 1.02 | 3.05 | 3.05 | 2.50 | 2.50 | 2.82 |
| $K_2O$ | 1.02 | 3.05 | 1.02 | 1.02 | 1.00 | 0.98 | 1.04 |
| $Cs_2O$ |  | 5.13 | 5.13 | 5.13 | 5.00 | 4.99 | 5.29 |
| $Nb_2O_5$ | 38.62 | 38.62 | 32.85 | 32.85 | 33.85 | 36.02 | 37.58 |
| $Bi_2O_3$ | 14.23 | 12.23 | 14.00 | 14.00 | 14.00 | 13.68 | 7.76 |
| MgO |  |  |  |  |  |  |  |
| BaO | 2.03 | 0 | 2.00 | 4.00 | 5.00 | 3.83 | 4.07 |
| CaO |  |  |  |  |  |  |  |
| SrO |  |  |  |  |  |  |  |
| $TiO_2$ |  |  |  |  |  |  |  |
| $WO_3$ | 14.23 | 14.03 | 14.03 | 14.03 | 14.03 | 13.59 | 14.40 |
| $MoO_3$ |  | 0.01 | 0.01 | 0.01 | 0.01 | 0.01 | 0.01 |
| $Sb_2O_3$ | 0.41 | 0.10 | 0.10 | 0.10 | 0.10 | 0.10 | 0.10 |
| Σ | 100.0 | 100.0 | 100.0 | 100.0 | 100.1 | 100.14 | 100.0 |

TABLE II-continued

| | | | | | | | |
|---|---|---|---|---|---|---|---|
| Σ R$_2$O | 4.07 | 9.19 | 9.19 | 9.19 | 8.50 | 8.47 | 9.15 |
| Σ RO | 2.03 | 0.00 | 2.00 | 4.00 | 5.00 | 3.83 | 4.07 |
| Σ Nb$_2$O$_5$ + WO$_3$ + Bi$_2$O$_3$ | 67.08 | 64.87 | 60.88 | 60.88 | 61.88 | 63.29 | 59.73 |
| Properties | | | | | | | |
| n$_d$ (7 K/h) | 1.93628 | 1.91301 | 1.87382 | 1.88660 | 1.88576 | 1.91287 | 1.88734 |
| ν$_d$ (7 K/h) | 20.61 | 20.46 | 22.66 | 22.47 | 22.29 | 21.36 | 22.08 |
| P$_{gF}$ | 0.6357 | 0.6371 | 0.6271 | 0.6283 | 0.6296 | 0.6332 | 0.6302 |
| ΔP$_{gF}$ | | 0.0277 | 0.0214 | 0.0223 | 0.0233 | 0.0253 | 0.0235 |
| α$_{(20, 300° C.)}$ [10$^{-6}$/K] | 7.06 | 6.42 | 7.88 | 8.28 | 7.73 | 7.55 | 7.37 |
| α$_{(100, 300° C.)}$ [10$^{-6}$/K] | | | | | | | 7.60 |
| α$_{(-20, 70° C.)}$ [10$^{-6}$/K] | 5.87 | | | | | | 6.35 |
| Tg [° C.] | 527 | 570 | 516 | 518 | 532 | 532 | 543 |
| ρ [g/cm$^3$] | 4.27 | 4.1996 | 4.1896 | 4.2868 | 4.2400 | 4.3247 | 4.150 |
| ΔT = [T(η = 10$^{7.6}$) − T(η = 10$^{13}$ dPas)] [K] | 120 | | 113 | 112 | 117 | 116 | 120 |
| SR | 1.0 | | | | | | 1.0 |
| AR | 1.3 | | | | | | 1.2 |

EXEMPLARY GLASS COMPOSITIONS 8 TO 14 (BASED ON OXIDE CONTENT IN % BY WEIGHT) AND THEIR PROPERTIES

| | Example No. | | | | | | |
|---|---|---|---|---|---|---|---|
| | 8 % by weight | 9 % by weight | 10 % by weight | 11 % by weight | 12 % by weight | 13 % by weight | 14 % by weight |
| P$_2$O$_5$ | 20.35 | 20.34 | 20.42 | 20.83 | 22.84 | 20.64 | 19.08 |
| GeO$_2$ | 5.87 | 5.87 | 5.94 | 5.00 | 5.00 | 5.00 | 5.50 |
| Li$_2$O | 2.75 | 2.75 | 2.78 | 3.05 | 3.05 | 3.05 | 0.00 |
| K$_2$O | 1.01 | 1.01 | 1.02 | 1.02 | 1.02 | 1.02 | 6.00 |
| Cs$_2$O | 2.78 | 3.18 | 3.62 | 5.13 | 5.13 | 5.13 | 6.00 |
| Nb$_2$O$_5$ | 35.05 | 34.67 | 35.14 | 32.85 | 32.85 | 40.82 | 32.88 |
| Bi$_2$O$_3$ | 14.11 | 14.11 | 12.44 | 14.00 | 14.00 | 12.23 | 14.30 |
| MgO | | | | | 2.00 | | |
| BaO | 3.96 | 3.96 | 4.01 | 2.00 | | | |
| CaO | | | | 2.00 | | | |
| SrO | | | | | | | 3.00 |
| TiO$_2$ | | | 0.32 | | | | |
| WO$_3$ | 14.02 | 14.01 | 14.20 | 14.03 | 14.03 | 12.03 | 13.14 |
| MoO$_3$ | 0.01 | 0.01 | 0.01 | | | | |
| Sb$_2$O$_3$ | 0.10 | 0.10 | 0.10 | 0.10 | 0.10 | 0.10 | 0.10 |
| Σ | 100.0 | 100.0 | 100.0 | 100.0 | 100.0 | 100.0 | 100.0 |
| Σ R$_2$O | 6.54 | 6.94 | 7.42 | 9.19 | 9.19 | 9.19 | 12.00 |
| Σ RO | 3.96 | 3.96 | 4.01 | 4.00 | 2.00 | 0.00 | 3.00 |
| Σ Nb$_2$O$_5$ + WO$_3$ + Bi$_2$O$_3$ | 63.18 | 62.79 | 61.78 | 60.88 | 60.87 | 65.07 | 60.33 |
| Properties | | | | | | | |
| n$_d$ (7 K/h) | 1.90959 | 1.90657 | 1.90546 | 1.88829 | 1.87242 | 1.91967 | 1.90736 |
| ν$_d$ (7 K/h) | 21.65 | 21.74 | 21.66 | 22.53 | 22.65 | 20.75 | 21.39 |
| P$_{gF}$ | 0.6315 | 0.6310 | 0.6317 | 0.62790 | 0.6280 | 0.6351 | 0.6334 |
| ΔP$_{gF}$ | 0.0241 | 0.0237 | 0.0243 | 0.02210 | 0.0223 | 0.0262 | 0.0256 |
| α$_{(20, 300° C.)}$ [10$^{-6}$/K] | 7.63 | 7.64 | 7.61 | 8.41 | 7.84 | 7.16 | 8.20 |
| α$_{(100, 300° C.)}$ [10$^{-6}$/K] | | | 7.80 | 8.64 | | | 8.27 |
| α$_{(-20, 70° C.)}$ [10$^{-6}$/K] | | | 6.51 | | | | |
| Tg [° C.] | 525 | 525 | 521 | 508 | 515 | 538 | 595* |
| ρ [g/cm$^3$] | 4.305 | 4.3070 | 4.2710 | 4.2508 | 4.1348 | 4.1694 | 4.2279 |
| ΔT = [T(η = 10$^{7.6}$) − T(η = 10$^{13}$ dPas)] [K] | | | 120 | 96 | 113 | | 106.00 |
| SR | 1.2 | | 1.0 | | | | |
| AR | 1.3 | | 1.2 | | | | |

The glass according to the present invention has a glass transition temperature Tg of less than or equal to 595° C., can be processed satisfactorily and has a very good resistance to alkali. The coefficients of thermal expansion are in a range of well below 9×10$^{-6}$/K, measured in the temperature range from 20 up to 300° C.

The disclosure in German Patent Application 10 2005 039 172.9 of Aug. 17, 2005 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a lead-free and arsenic-free niobium phosphate optical glass, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

What is claimed is:

1. A lead-free and arsenic-free optical glass with a refractive index $n_d$ of $1.86 \leq n_d \leq 1.95$ and an Abbe number $v_d$ of $19 \leq v_d \leq 24$, wherein said optical glass is free of lead, free of arsenic, free of $Na_2O$, free of $B_2O_3$, and has a glass composition (based on oxide content in % by weight) comprising:

| | |
|---|---|
| $P_2O_5$ | 18-25 |
| $Nb_2O_5$ | 30-40 |
| $Bi_2O_3$ | 6-18 |
| $WO_3$ | 12-17 |
| $GeO_2$ | 2-7 |
| $Li_2O$ | 0.7-4 |
| $K_2O$ | 0.5-4 |
| $Cs_2O$ | 1-6 |
| MgO | 0-4 |
| CaO | 0-4 |
| SrO | 0-4 |
| BaO | 0-6 |
| ZnO | 0-4 |
| $TiO_2$ | 0-1.5 |
| Σ Alkali oxides | 3-9 |
| Σ Alkaline-earth oxides | 0.5-6 |
| Σ $Nb_2O_5$, $WO_3$, $Bi_2O_3$ | $\geq 57$ |
| a fining agent | 0-2. |

2. The glass according to claim 1, containing as said fining agent at least one (in % by weight) of:

| | |
|---|---|
| $Sb_2O_3$ | 0-1 and/or |
| SnO | 0-1 and/or |
| $SO_4^{2-}$ | 0-1 and/or |
| F | 0-1. |

3. The glass according to claim 1, and which is free of at least one oxide component selected from the group consisting of $SiO_2$ and fluorine.

4. A glass material for mapping, projection, telecommunication, optical communication engineering, mobile drive and/or laser technology, said glass material consisting of a glass according to claim 1.

5. An optical element comprising a glass according to claim 1.

6. A method of producing an optical element, said method comprising the step of precision pressing a glass according to claim 1.

7. A glass according to claim 1, having a transformation temperature (Tg) of no more than 595° C.

8. A glass according to claim 1, having a viscosity that decreases from $10^{13}$ to $10^{7.6}$ dPas over a temperature interval (ΔT) of at most 120 K.

9. A glass according to claim 1, having a transformation temperature (Tg) of no more than 595° C. and a viscosity that decreases from $10^{13}$ to $10^{7.6}$ dPas over a temperature interval (ΔT) of at most 120 K.

* * * * *